June 12, 1951 H. A. WHEELER 2,556,607
WAVE-SIGNAL TRANSLATING ARRANGEMENT
Filed July 27, 1946
FIG. 1
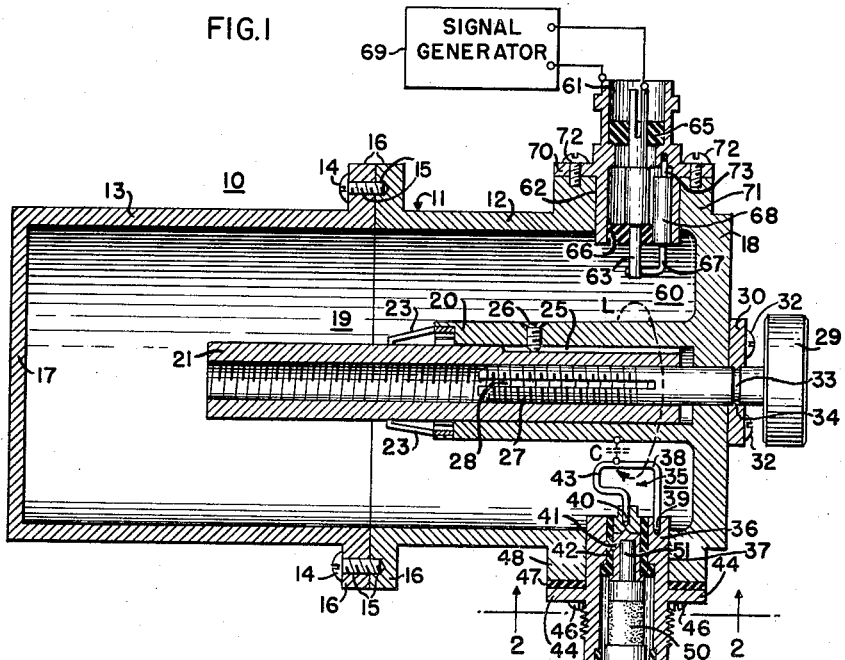
FIG. 2
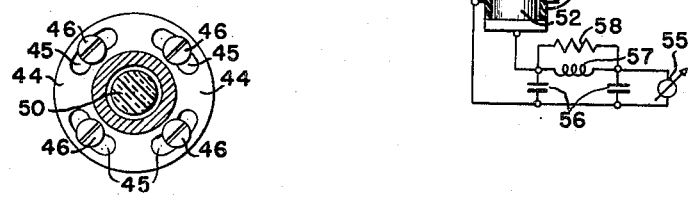
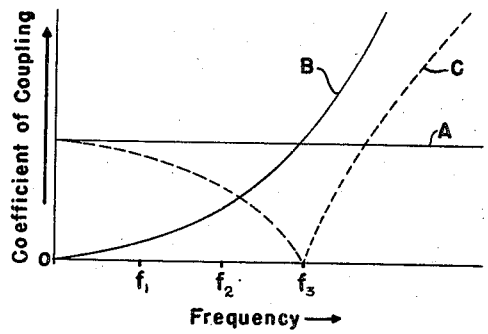
FIG. 3
INVENTOR.
HAROLD A. WHEELER
BY *Harry C. Page*
ATTORNEY Patented June 12, 1951

2,556,607

UNITED STATES PATENT OFFICE 2,556,607

WAVE-SIGNAL TRANSLATING ARRANGEMENT

Harold A. Wheeler, Great Neck, N. Y., assignor to Hazeltine Research, Inc., Chicago, Ill., a corporation of Illinois Application July 27, 1946, Serial No. 686,683

6 Claims. (Cl. 178—44)

The present invention relates to wave-signal translating arrangements and, particularly, to arrangements which are adapted to translate high-frequency wave signals within a selected range of frequencies while the electric and the magnetic couplings, sometimes referred to as respective capacitive and inductive couplings, approximately cancel for undesired high-frequency wave-signal components having a frequency outside of the selected range of frequencies so that the last-mentioned components are not effectively translated.

Opposing electric and magnetic couplings have been employed in low-frequency signal-translating arrangements such as broadcast receivers for such purposes as obtaining a substantially constant response in the radio-frequency stages thereof over the entire tuning range of the receiver. Such arrangements, however, have utilized lumped circuit elements. To a very limited extent, counteracting electric and magnetic couplings have been incorporated into high-frequency arrangements embodying distributed circuit constants. In circuits of the last-mentioned type, for example, harmonic traps have been included in resonant transmission-line signal-translating arrangements, but these arrangements have employed electric and magnetic couplings which were distributed over a substantial length of the transmission line to effect the desired cancellation of the undesired harmonic. An arrangement of the last-mentioned type is described and claimed in applicant's copending application entitled "Wave-Signal Translating System," Serial No. 627,473, filed November 8, 1945, now Patent No. 2,527,664, issued October 31, 1950, and assigned to the same assignee as the instant invention.

It is frequently desirable in a high-frequency signal-translating arrangement to provide an arrangement such that the electric and magnetic couplings effectively cancel for an undesirable wave-signal frequency and to accomplish this effect with a circuit element of limited size so that the latter occupies a relatively small space within the arrangement. A high-frequency wave meter is representative of such a system. Since the arrangement of the instant invention has particular utility in that connection, it will be described in that environment.

In the measurement of the frequency of a high-frequency alternating source, a wave meter in the form of a resonant circuit having extremely low electrical losses usually is employed. An input circuit of the wave meter is coupled to the source and the output circuit of the wave meter is coupled to an indicating device which may comprise a detector connected to a meter. The wave meter is usually adjustable over a selected range of frequencies, and an observation of the adjustment of the wave meter and a comparison with a calibration chart is generally used to ascertain the frequency to which the wave meter is tuned.

Such frequency-measuring arrangements have proved useful for many purposes, but are subject to some defects. Undesired high-frequency wave-signal components outside of the selected range of frequencies, for example, harmonics such as the third harmonic of the signal, may also be translated by the wave meter to the indicating device. These undesired wave-signal components may cause the indicating device to provide a reading denoting a condition of resonance which is considerably in error. Due to the translation of an undesired harmonically related component, the wave meter by overtone resonance may exhibit a confusing double peaked response when tuned in the vicinity of resonance, or may have a response which is shifted from the correct resonant response point by a material amount. Accordingly, the usefulness and accuracy of such an arrangement as a precision equipment is seriously impaired.

It is an object of the present invention, therefore, to provide a new and improved wave-signal translating arrangement which avoids one or more of the disadvantages of prior wave-signal translating arrangements of the type described.

It is another object of the present invention to provide a wave-signal translating arrangement which is adapted to translate high-frequency wave signals within a selected range of frequencies while substantially rejecting high-frequency wave-signal components having a frequency outside of the aforesaid range of frequencies.

It is a further object of the invention to provide a wave-signal translating arrangement which is compact in construction and relatively easy to adjust in order to effect translation of high-frequency wave-signal components within a selected range of frequencies while rejecting undesired high-frequency wave-signal components having a frequency outside of the above-mentioned range of frequencies.

In accordance with one form of the invention, a wave-signal translating arrangement which is adapted to translate high-frequency wave signals within a selected range of frequencies comprises a wave guide which is arranged to resonate in a desired mode within the foregoing frequency range. As employed throughout the specification and claims, the term "wave guide" is employed in a broad sense to denote any structure having at least one conductive surface which functions as a boundary for electromagnetic waves and is effective to direct the propagation of these waves along a predetermined path. The arrangement also comprises a coupling loop dimensioned to occupy a space along the wave guide substantially less than one-half wave length at a predetermined undesired harmonically related frequency outside of the selected range and arranged in a predetermined position with relation to the wave guide that it is electrically and magnetically coupled thereto with the electric coupling so proportioned as to magnitude and polarity with reference to the magnetic coupling that, while the arrangement effectively translates high-frequency wave signals within the selected range, the electric coupling and the magnetic coupling approximately cancel for specific wave-signal components having the aforesaid harmonically related frequency outside of the selected range.

For a better understanding of the present invention, together with other and further objects thereof, reference is had to the following description taken in connection with the accompanying drawing, and its scope will be pointed out in the appended claims.

Referring now to the drawing, Fig. 1 is a vertical longitudinal sectional view of a wave-signal translating arrangement in accordance with the instant invention, with associated electrical units illustrated schematically; Fig. 2 is a sectional view along the line 2—2 of Fig. 1; and Fig. 3 is a graph which is utilized in explaining the operation of the arrangement of Fig. 1.

Referring now more particularly to Fig. 1 of the drawing, the wave-signal translating arrangement there represented is adapted to translate high-frequency wave signals within a desired range of frequencies and comprises a wave guide in the form of a coaxial cavity resonator 10 which is arranged to resonate in a desired mode, specifically the fundamental mode, within the foregoing frequency range. Cavity resonator 10 includes an outer conductor 11 comprising a first hollow member 12 which is attached to a second hollow member 13 by means of a plurality of screws 14, 14 which co-operate with suitable bores 15, 15 in abutting annular flanges 16, 16. Members 12 and 13 have closed ends 17 and 18 to prevent the radiation therefrom of the electromagnetic field developed therein in a manner hereinafter to be described. Outer conductor 11 preferably has an electrical length somewhat greater than one-quarter wave length of the longest wave signal within the selected range of frequencies which are translated by the arrangement.

Cavity resonator 10 also comprises an inner conductor 19 spaced from the outer conductor 11. This inner conductor includes a fixed hollow member 20 which telescopically receives a hollow internally threaded movable member 21. A series of conductive spring fingers 23, 23 are imbedded in the free end of the fixed member 20 of the inner conductor 19 and resiliently engage the periphery of the movable member 21 to assure a low-impedance path for high-frequency currents. The movable member 21 of the inner conductor is provided with a longitudinal slot 25 in the outer periphery thereof which receives the end of a set screw 26 that passes through a threaded radial bore in the fixed member 20 to prevent rotation of the movable member 21. A threaded shaft 27 having a longitudinal slit 28 at one end thereof co-operates with the internally threaded region of the hollow movable member 21 so that rotation of an adjusting knob 29 on the shaft 27 serves to adjust the effective electrical length of the inner conductor and hence the cavity resonator 10. The slit 28 permits a resilient engagement between the threads of member 21 and shaft 27, thus reducing backlash. A split washer 30 is secured to the end 18 of member 12 by screws 32, 32 and includes an annular rib 33 of reduced thickness which engages an annular groove 34 in the shaft 27 to retain the latter in a fixed axial position during rotation thereof. The shaft 27 may be provided with suitable means (not shown) to indicate the position of the movable member 21 of the inner conductor 19 with respect to the end 18 of the cavity resonator 10.

For compactness of construction, the cavity resonator 10 comprises a quarter-wave length transmission line section which is short-circuited at end 18 and is tunable over the selected range of frequencies by adjustment of the effective length of the inner conductor 19 thereof. Due to this short circuit, the cavity resonator 10 effectively includes at end 18 a region of minimum standing-wave potential between the inner conductor 19 and the outer conductor 11.

The wave-signal translating arrangement of the instant invention also includes a movable coupling loop 35, which is positioned within the cavity resonator 10. The loop 35 is electrically and magnetically coupled with the inner conductor 19 thereof and is dimensioned to occupy a space therealong which is substantially less than one-half wave length at an undesired frequency outside of the selected range of frequencies to which the cavity resonator may be adjusted. For example, this frequency outside of the selected range may be a third-harmonic frequency as previously mentioned. Coupling loop 35 is attached to one end of a hollow cylindrical plunger 36 which is rotatably and axially movable in a cylindrical bore 37 in the outer conductor 11 of the cavity resonator near the region of minimum standing-wave potential thereof. Plunger 36 therefore comprises a means for positioning the coupling loop 35 within the cavity resonator 10 so that it is electrically and magnetically coupled with the inner conductor 19 thereof. Coupling loop 35 includes a portion 38 which is substantially parallel to the end 18 and is positioned in closer proximity to the region of minimum standing-wave potential than the remaining portion 43 thereof for a purpose subsequently to be explained. A termination 39 of the coupling loop 35 at the end of portion 38 is mechanically and electrically connected to the plunger 36 in a suitable manner as by soldering or brazing. A length of portion 43 extends substantially parallel to the inner conductor 19 and includes at one end thereof a second termination 40 for the coupling loop. Termination 40 is suitably bonded to a centrally located electrical connector 41 which is insulated from the body portion of the cylindrical plunger 36 by an insulating sleeve 42 that is retained therein by a press fit. Plunger 36 is provided with a flange 44 having several elongated apertures 45, 45 (see Fig. 2) through which pass screws 46, 46. The screws 46 also pass through suitable apertures (not shown) in a removable spacing disc 47 and secure the plunger 36 in a suitable position to an annular projection 48 on the member 12. The spacing disc 47 has a thickness such that when the plane of the coupling loop is parallel to the axis of the inner conductor 19, the magnetic coupling equals or exceeds the electric coupling of the loop with the inner conductor for the undesired harmonic. The apertures 45, 45, therefore, permit rotational adjustment of the plunger 36 with respect to the cavity resonator 10.

The hollow plunger 36 is adapted removably to retain a conventional detector 50, for example, one of the crystal type which has one terminal 51 which engages the connector 41 and another terminal 52 which is confined in and insulated from the body portion of the plunger 36 by an insulating sleeve 54. The body portion of plunger 36 and the terminal 52 of the detector 50 are connected to a suitable meter 55 through a filter network for radio-frequency currents comprising condensers 56, 56 in the shunt arms thereof and a parallel combination of an inductor 57 and a resistor 58 in the series arm thereof.

The arrangement of the present invention also includes an additional coupling loop 60, which is positioned within the cavity resonator 10 near the region of minimum standing-wave potential, for exciting the cavity resonator with high-frequency wave signals within the selected range. Coupling loop 60 is mounted on a hollow cylindrical plunger 61 generally similar to the described plunger 36. Plunger 61 rests in a bore 62, which is preferably located diametrically opposite the bore 37, and includes a centrally located conductive rod 63 which is maintained in position by means of insulating discs 65 and 66. A lead 67 of a resistor 68 is suitably bonded to the inner end of the rod 63 to form the bight of the coupling loop 60 while another lead 73 of the resistor is bonded to the inner surface of the plunger 61. Coupling loop 60 is preferably oriented with the lead 60 near the region of minimum standing-wave potential at the end 18 of the resonator. A high-frequency signal generator 69, the frequency of which is to be measured, is connected to the outer end of rod 63 and to the plunger 61 to supply wave-signal energy to the coupling loop 60. Resistor 68 serves to match the impedance of the coupling loop to that of the signal generator 69. Plunger 61 has a flanged portion 70 which is similar to the flanged portion 44 of plunger 36 and is attached to an annular projection 71 on the member 12 by means of screws 72, 72.

From the foregoing description, it will be seen that the arrangement comprises a low-loss wave meter which is adapted to measure the frequency of a unit such as the signal generator 69, and its operation will be explained in that connection. Considering now the operation of the Fig. 1 arrangement, it will first be noted that if an initial adjustment of the movable member 21 of the inner conductor 19, by movement of the adjusting knob 29, is made to tune the cavity resonator 10 to the frequency of the high-frequency wave signal developed by the generator 69 a faulty reading may result. This faulty reading may comprise a double peaked or other confusing indication on the meter 55. This type of indication may be caused by unavoidable impedance discontinuities present in or introduced into the cavity resonator by the coupling loops 35 and 60, end effects, nonuniform diameter of the inner conductor 19, or loading of the resonator. These factors may produce undesirable standing waves which are approximately but not exactly harmonically related to the desired wave signal translated from the input coupling loop 60 to the output coupling loop 35 so that the indications on the meter 55 and the setting of the adjustable member 21 will not afford a precise indication of the frequency of the signal developed by the signal generator 69. It has been determined experimentally that an overtone resonance which does not correspond to an exact harmonic of the fundamental resonance of the wavemeter, but which is approximately a third harmonic thereof, is usually particularly troublesome in arrangements of the character described.

To prevent the translation of a particular wave-signal component, such as the third-harmonic component, which is outside of the desired range of frequencies of the signal-translating arrangement including the cavity resonator 10, the apparatus is first adjusted to discriminate thereagainst. To effect this adjustment, a signal generator which develops a wave signal having a frequency approximately corresponding to the undesired component is applied to the input loop 60. As previously mentioned, the spacing disc 47 is of such thickness and the design of the coupling loop 35 is such that the magnetic coupling is approximately equal to or exceeds the electric coupling for the third harmonic with the coupling loop oriented with its plane parallel to that of the axis of the inner conductor 19. If it is necessary to secure exact compensation, the screws 46, 46 are loosened and the coupling loop is adjusted by rotating the cylindrical plunger 36 until a minimum indication is observed on the meter 55 whereupon the coupling loop and its associated plunger are secured.

The generator of the undesired component is then disconnected from the plunger 61, and the signal generator 69 is connected to the input coupling loop 60. A distinct maximum indication may then be observed on the meter 55 when the cavity resonator 10 is tuned by adjustment of the knob 29 accurately to resonate the cavity resonator with the signal applied by the generator 69 to the coupling loop 60. By observing the setting of the shaft 27, the frequency of the signal developed by the signal generator 69 may be determined in the well-known manner.

Under the conditions just described, the electric coupling of the coupling loop 35 with the inner conductor 19 is so proportioned, as to magnitude and polarity with respect to the magnetic coupling thereof, that, while the desired high-frequency wave signals are effectively translated, the undesired or third-harmonic frequency component outside of the selected range is approximately cancelled. This results for reasons presently to be explained. It has been determined experimentally that opposing magnetic and electric coupling for the undesired harmonic may be obtained by adjusting the coupling loop 35 in the manner previously described since the portion 38 of the coupling loop is effectively at the same minimum standing-wave potential as the short-circuited end 18 of the cavity resonator. Adjustment of the coupling loop 35 longitudinally of its axis primarily influences the capacitive coupling with the inner conductor 19 while rotation of the coupling loop about its axis adjusts the extent of the inductive coupling. Since the couplings are in opposing relationship, a cancellation for the undesired wave-signal components may be achieved without greatly influencing the translation of the desired wave signal. This may be better understood by reference to the graphs of Fig. 3 wherein curve A illustrates the effect of a change in frequency on the coefficient of inductive coupling of the coupling loop 35. It will be noted that this coefficient remains uniform with changes in frequency. Curve B represents the variation with frequency in the coefficient of capacitive coupling of the coupling loop 35, and this curve is approximately proportional to the square of the frequency of the wave signal in the resonator 10. Frequencies $f_1$, $f_2$, and $f_3$ represent, respectively, the fundamental frequency of the wave signal in the cavity resonator 10, and the second and third harmonics thereof. The broken-line curve C represents the difference between curves A and B and shows the effects of the opposed couplings afforded by the adjustable coupling loop over a range of frequencies. It will be observed that at the third-harmonic frequency $f_3$, the inductive coupling and the capacitive coupling are equal and, since they are in opposing relationship, a cancellation occurs. However, at the desired or fundamental frequency the inductive coupling afforded by the coupling loop 35 predominates so that wave-signal components within that range are effectively translated by the coupling loop 35 to the described utilizing circuit connected thereto. Referring again to Fig. 1, it will be observed that the input coupling loop 60 and the output coupling loop 35 are separated so any coupling directly between these two loops is minimized.

While the wave guide 10 has been described as a closed quarter wave-length coaxial transmission line short circuited at one end, it will be manifest that it may be an open or unshielded structure and may have other resonant lengths and configurations which are effective to provide a region of low impedance near the output coupling loop 35.

From the foregoing description, it will be apparent that the wave-signal translating arrangement of the instant invention is compact in construction and is relatively easy to adjust to permit the translation of desired high-frequency wave-signal components while rejecting undesired high-frequency wave-signal components.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal translating arrangement which is adapted to translate high-frequency wave signals within a selected range of frequencies comprising: a wave guide arranged to resonate in the fundamental mode within said selected range; and a coupling loop dimensioned to occupy a space along said wave guide substantially less than one-half wave length at a predetermined undesired harmonically related frequency outside of said selected range and arranged in a predetermined position with relation to said wave guide that it is electrically and magnetically coupled thereto with said electric coupling so proportioned as to magnitude and polarity with reference to said magnetic coupling that, while said arrangement effectively translates high-frequency wave signals within said selected range, the electric coupling and the magnetic coupling for specific wave-signal components having said predetermined frequency outside of said selected range approximately cancel.

2. A wave-signal translating arrangement which is adapted to translate high-frequency wave signals within a selected range of frequencies comprising: a wave guide arranged to resonate in a desired mode within said selected range; and a coupling loop dimensioned to occupy a space along said wave guide substantially less than one-half wave length at a predetermined undesired harmonically related frequency and arranged in a predetermined position with relation to said wave guide that it is electrically and magnetically coupled thereto with said electric coupling so proportioned as to magnitude and polarity with reference to said magnetic coupling that, while said arrangement effectively translates high-frequency wave signals within said selected range, the electric coupling and the magnetic coupling for specific wave-signal components having said harmonically related frequency approximately cancel.

3. A wave-signal translating arrangement which is adapted to translate high-frequency wave signals within a selected range of frequencies comprising: a wave guide arranged to resonate in a desired mode within said selected range; a coupling loop dimensioned to occupy a space along said wave guide substantially less than one-half wave length at a predetermined undesired harmonically related frequency outside of said selected range and positioned with relation to said wave guide that it is electrically and magnetically coupled thereto; and means for adjusting said position of said coupling loop to control the magnitude and the polarity of said electric coupling with reference to said magnetic coupling so that, while said arrangement effectively translates high-frequency wave signals within said selected range, the electric coupling and the magnetic coupling for specific wave-signal components having said predetermined frequency outside of said selected range approximately cancel; said coupling loop being adjusted to said position of adjustment in which said predetermined electric and magnetic couplings approximately cancel.

4. A wave-signal translating arrangement which is adapted to translate high-frequency wave signals within a selected range of frequencies comprising: a wave guide arranged to resonate in a desired mode within said selected range; and a coupling loop dimensioned to occupy a space along said wave guide substantially less than one-half wave length at a predetermined undesired harmonically related frequency outside of said selected range and arranged in a predetermined position with relation to said wave guide that it is electrically and magnetically coupled thereto with said electric coupling so proportioned as to magnitude and polarity with reference to said magnetic coupling that said magnetic coupling predominates for wave-signal components within said selected range and, while said arrangement effectively translates high-frequency wave signals within said selected range, the electric coupling and the magnetic coupling for specific wave-signal components having said predetermined frequency outside of said selected range approximately cancel.

5. A wave-signal translating arrangement which is adapted to translate high-frequency wave signals within a selected range of frequencies comprising: a cavity resonator arranged to resonate in a desired mode within said selected range; and a coupling loop positioned within said cavity resonator so as to be electrically and magnetically coupled thereto and dimensioned to occupy a space therein substantially less than one-half wave length at a predetermined undesired harmonically related frequency outside of said selected range with said electric coupling so proportioned as to magnitude and polarity with reference to said magnetic coupling because of the dimensioning and position of said loop that, while said arrangement effectively translates high-frequency wave signals within said selected range, the electric coupling and the magnetic coupling for specific wave-signal components having said predetermined frequency outside of said selected range approximately cancel.

6. A wave-signal translating arrangement which is adapted to translate high-frequency wave signals within a selected range of frequencies comprising: a wave guide arranged to resonate in a desired mode within said selected range and effectively including a region of minimum standing-wave potential; a coupling loop dimensioned to occupy a space along said wave guide substantially less than one-half wave length at a predetermined undesired harmonically related frequency outside of said selected range; means for positioning said coupling loop along said wave guide near said region of minimum standing-wave potential so that said coupling loop is electrically and magnetically coupled to said wave guide with one portion of said coupling loop in closer proximity to said region of minimum potential than the other portion thereof, and including a termination for said coupling loop effectively at said region of minimum potential so that said magnetic and electric couplings are in opposing relationship; and means for adjusting the magnitude of said magnetic coupling with respect to that of said electric coupling so that, while said arrangement effectively translates high-frequency wave signals within said selected range, the electric coupling and the magnetic coupling for specific wave-signal components having said predetermined frequency outside of said selected range approximately cancel; said coupling loop being adjusted to said position of adjustment in which said predetermined electric and magnetic couplings approximately cancel.

HAROLD A. WHEELER.

REFERENCES CITED

The following references are of record in the file of this patent:

UNITED STATES PATENTS

| Number | Name | Date |
|---|---|---|
| 2,365,207 | Moles | Dec. 19, 1944 |
| 2,402,663 | Ohl | June 25, 1946 |
| 2,412,393 | Ghosh | Dec. 10, 1946 |
| 2,417,542 | Carter | Mar. 18, 1947 |
| 2,423,416 | Sontheimer | July 1, 1947 |
| 2,444,041 | Harrison | June 29, 1948 |